(12) United States Patent
Gadouche et al.

(10) Patent No.: US 9,251,385 B2
(45) Date of Patent: Feb. 2, 2016

(54) COMPUTER SYSTEM FOR ACCESSING CONFIDENTIAL DATA BY MEANS OF AT LEAST ONE REMOTE UNIT AND REMOTE UNIT

(75) Inventors: Kamel Gadouche, Orsay (FR); Eric Debonnel, Malakoff (FR)

(73) Assignee: GROUPE DES ECOLES NATIONALES D'ECONOMIE ET STATISTIQUE, ETABLISSEMENT PUBLIC A CARACTERE SCIENTIFIQUE, CULTUREL ET PROFESSIONNEL, Paris (FR)

( * ) Notice: Subject to any disclaimer, the term of this patent is extended or adjusted under 35 U.S.C. 154(b) by 865 days.

(21) Appl. No.: 13/501,125

(22) PCT Filed: Oct. 11, 2010

(86) PCT No.: PCT/FR2010/052143
§ 371 (c)(1),
(2), (4) Date: Apr. 10, 2012

(87) PCT Pub. No.: WO2011/045516
PCT Pub. Date: Apr. 21, 2011

(65) Prior Publication Data
US 2012/0198225 A1 Aug. 2, 2012

(30) Foreign Application Priority Data
Oct. 12, 2009 (FR) ...................................... 09 57127

(51) Int. Cl.
*H04L 9/32* (2006.01)
*G06F 21/86* (2013.01)
*G06F 21/57* (2013.01)

(52) U.S. Cl.
CPC ................ *G06F 21/86* (2013.01); *G06F 21/57* (2013.01)

(58) Field of Classification Search
CPC combination set(s) only.
See application file for complete search history.

(56) References Cited

U.S. PATENT DOCUMENTS 5,966,671 A * 10/1999 Mitchell ............. H04M 1/0214
455/550.1
2002/0042882 A1 * 4/2002 Dervan et al. ................. 713/200

(Continued)

FOREIGN PATENT DOCUMENTS

EP  1 962 221  8/2008

OTHER PUBLICATIONS

International Search Report dated Dec. 28, 2010, corresponding to PCT/FRF2010/052143.

*Primary Examiner* — Taghi Arani
*Assistant Examiner* — Phy Anh Vu
(74) *Attorney, Agent, or Firm* — Young & Thompson

(57) ABSTRACT

A computer system for accessing confidential data via at least one remote unit (4), the data being stored in a secured centralized computer system (3) including elements for processing data intended for producing results, a computer connection (2) being established between the unit and the computer element, the unit being a microcomputer operating under the dependency of a local operating system. The computer connection is an encrypted tunnel connection over a public network, the unit only supporting remote administration, the unit not being operable if the computer connection is not established and, during the access thereof to the data, the unit only receiving display information associated with the process performed on the data and produced by the centralized computer system, the microcomputer of the remote unit also including an electronic encryption circuit, the operating system and the information required for the operation of the unit being stored in encrypted form.

8 Claims, 1 Drawing Sheet

(56) References Cited

U.S. PATENT DOCUMENTS

| | | | |
|---|---|---|---|
| 2004/0060376 A1* | 4/2004 | Munro | 73/866.1 |
| 2006/0227367 A1* | 10/2006 | Kitada | 358/1.15 |
| 2007/0107060 A1* | 5/2007 | Engle et al. | 726/25 |
| 2007/0245409 A1 | 10/2007 | Harris et al. | |
| 2008/0271129 A1* | 10/2008 | Mukkara | H04L 63/08 726/8 |
| 2009/0089863 A1* | 4/2009 | Vanniarajan | 726/5 |

\* cited by examiner

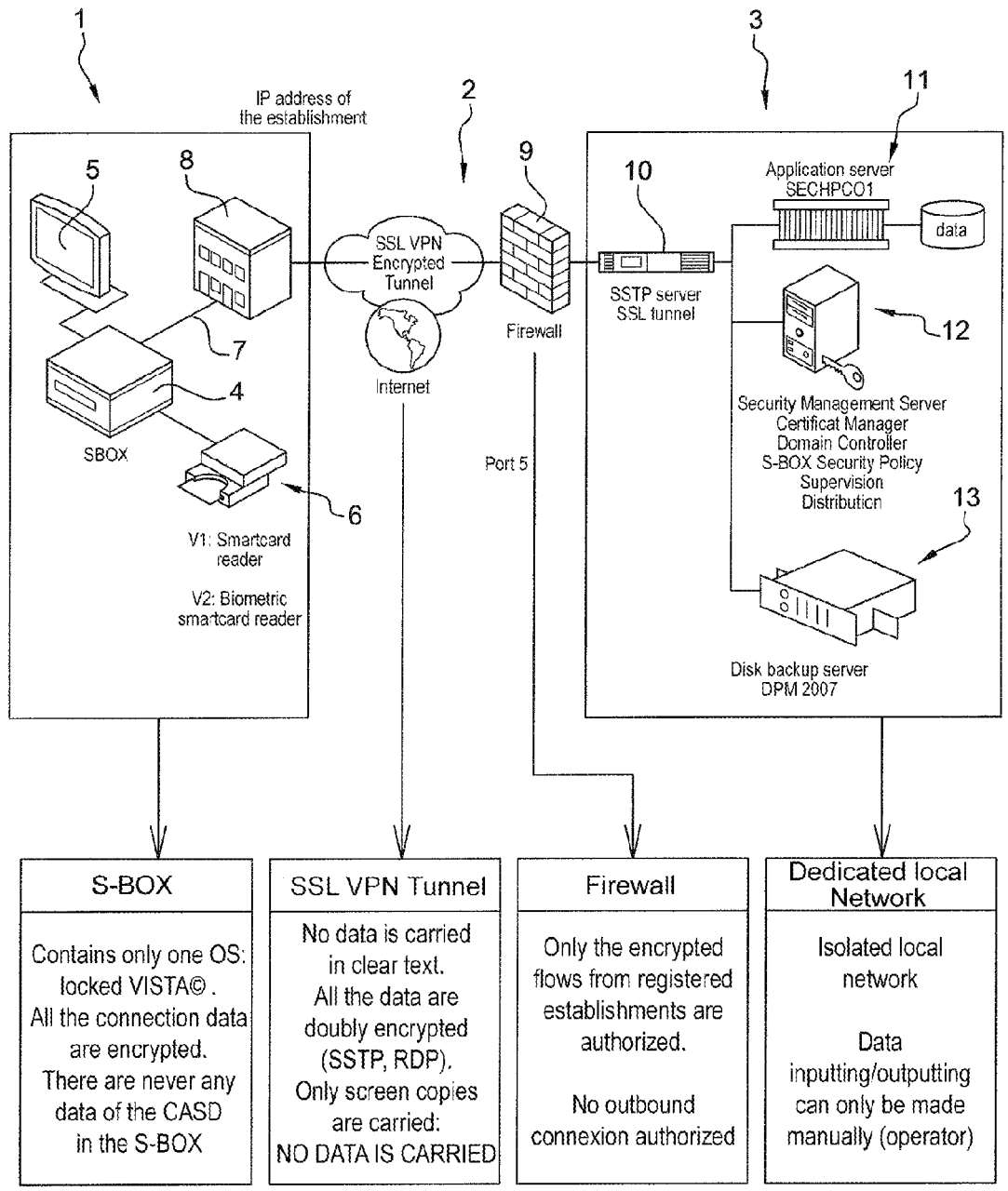

COMPUTER SYSTEM FOR ACCESSING CONFIDENTIAL DATA BY MEANS OF AT LEAST ONE REMOTE UNIT AND REMOTE UNIT

The present invention relates to a computer system for accessing confidential data by means of at least one remote unit, as well as to a remote unit. It has applications in the field of information processing, more particularly for securing confidential data contained in a centralized computer means and that have to be processed by remote users of said centralized computer means.

The invention object of the present patent has been developed in the Groupe des Ecoles Nationales d'Economie et Statistique (GENES—Group of National Schools of Economics and Statistics), attached to the Institut National de la Statistique et des Etudes Economiques (INSEE—National Institute of the Statistics and Economic Studies), attached to the Ministère de l'Economie, de l'Industrie et de l'Emploi (Ministry of Economy, Industry and Employment).

In many industries, commercial enterprises or teaching and/or research public institutions, computer databases exist, containing sensitive information that must remain confidential or, at the very least, that must not be able to be transferred or copied outside the place where it is stored or processed, generally in a computer server. However, users external to the storage place may have to use, via a public computer network, in particular INTERNET©, said information, which is for example individualized data for calculations, researches, etc., in order to produce results from said confidential data, wherein such results must not make it possible to go back to the original individual data.

It is therefore desirable to have a system that makes it possible to access and process such confidential data without even so the user, or even a malicious third party, being capable of recovering, from a remote access, the confidential data contained in a centralized server.

It is also desirable that the architecture of the proposed system can fulfill in good conditions the needs of the users/researchers wanting to work on said sensitive/confidential data. It is therefore necessary to take into account many constraints, such as high security constraints on all the components of the architecture, ergonomic constraints, including in particular an interface and tools for the users/researchers, allowing them to work in good conditions, integration constraints because it is necessary that the system can be integrated into the computer environment of the remote establishments of the users/researchers, whatever they are, and economic constraints.

In practice, the purpose of securing access to sensitive/confidential data is achieved by combining hardware means with software means, notably a specially configured remote unit with notably an encrypted tunnel connection over a public network. It is herein proposed, for accessing confidential data, to implement a particular equipment in a remote station, which is a dedicated and locked "black box" within a particular hardware and software architecture.

On the other hand, the state of the art in the aimed field of application is based on purely software solutions. And a purely software solution does not answer to the exposed problem:

it is less sure because it is based on a non-controlled basis, which is the remote user's workstation (RUWS). Such system is then exposed to data leakage that may be accidental or intentional (spy software, screen scraping system with character recognition . . . )

it is more expensive in terms of deployment because the RUWS is not necessarily compatible, in terms of maintenance because the RUWS development imposes a redeployment and, conversely, the software solution development may require updating the RUWS, in terms of assistance because a modification of the RUWS may lead to dysfunction of the software solution, etc.

This is such adherence with the remote user's computer environment which explains that a purely software solution does not fulfill the exposed needs. Therefore, the invention proposes a system implementing hardware means making it possible to avoid the above-mentioned drawbacks.

In the field of access control, the system described in US 2007/245409 is known.

Accordingly, the invention relates to a computer system for accessing confidential data by means of at least one remote unit used by a user, the data being stored in a secured centralized computer means comprising means for processing said data, intended for producing results, a computer connection being established between said remote unit and the centralized computer means, the remote unit being a microcomputer operating under the dependency of a local operating system starting by a boot phase.

According to the invention, the system is configured in such a manner that the computer connection is an encrypted tunnel connection over a public network, which is established within the system so that the remote unit is logically integrated into the centralized computer means, in order that said remote unit can only be remotely administered, and so that said unit cannot be operated if the computed connection is not established, the system being further configured in such a manner that, when the data are accessed, said remote unit receives only display information related to the process carried out on the data and produced by the centralized computer means, the microcomputer of the remote station being in the form of an electronic card that further comprises an encryption electronic circuit, the operating system as well as the information required for the operation of said remote unit being stored in encrypted form in said remote unit, and said remote unit is consisted of a sealed unit containing the electronic card and inputs/outputs, including one identification means input/output connected to at least one user identification means, and one computer network input/output intended for the encrypted tunnel connection.

The word "microcomputer" for the remote unit actually covers any programmable device offering a network access and comprising user-interface means.

In various embodiments of the invention, the following means are used, either alone or in any technically possible combination:

the remote unit can only be remotely administered by the centralized computer means, the remote unit further comprises a local configuration means that is accessible and visible by the user, said local configuration means comprising a display and a set of keys arranged in the unit and allowing an on-site configuration of local parameters, the local parameters that can be configured are, for example, display configurations, the network address of the unit, the public network is an INTERNET© network, the remote unit comprises a reduced number of connectable physical inputs/outputs, the connectable physical inputs/outputs are one keyboard input/output, one input/output for a pointer element, for example a mouse, one identification means input/output, one display screen input/output, one computer network input/output intended for the encrypted tunnel connection, the encryption electronic circuit of the unit's electronic card is of the TPM ("Trusted Platform Module") type, the TPM encryption electronic circuit operates with the BitLocker© technology, the microcomputer electronic card comprises a password-lockable BIOS, the microcomputer electronic card has one or several of the following characteristics: central memory capacity of at least 2 Go, VGA and/or DVI graphic display, computer network input/output of at least 10/100 Mbits/s, two USB inputs/outputs, mass memory of at least 32 Go (a chip or a mechanical element), the computer network input/output is on a RJ45 connector, the computer network input/output is compliant with a PXE boot (PXE stands for "Pre-boot eXecution Environment": start by the network), which can be parameterized and activated/deactivated from the electronic card BIOS, the electronic card is based on an industrial PC card of reduced format, the electronic card of the remote unit is of the Mini-ITX type, the remote unit size is approximately H 70 mm×D 200 mm×W 240 mm, the encrypted tunnel connection over a public network is made indirectly from the remote unit, the remote unit being connected to a local network and an equipment for interconnection to the public network being connected to said local network, the encrypted tunnel connection over a public network is made directly from the remote unit, with either an equipment for interconnection to the public network arranged between the computer network input/output of the remote unit and the public network, or the equipment for interconnection to the public network is incorporated to the remote unit, the equipment for interconnection to the public network is incorporated to the remote unit and the computer network input/output of the remote unit is omitted, the equipment for interconnection to the public network is incorporated to the remote unit and the computer network input/output of the remote unit is present, which allows the remote unit to be used either in direct or indirect mode over the public network, the equipment for interconnection to the public network is of the wire or radio type, the encrypted tunnel connection is of the SSL VPN type ("Secure Sockets Layer Virtual Private Network"), the encryption over the encrypted tunnel connection is a double encryption: SSTP ("Secured Socket Tunneling Protocol") and RDP ("Remote Desktop Protocol"), the operating system of the remote station is chosen among the products of the WINDOWS© family, the remote unit further comprises a firewall, which protects it from the host local network, the display comprises a liquid crystal alphanumerical display, the liquid crystal alphanumerical display is of the "1 line 16 characters" type, the liquid crystal alphanumerical display is of the "2 lines 16 characters" type, the set of keys is a reduced set of less than 7 keys, the remote unit is power supplied by a supply source external to the unit, the supply source external to the unit is a mains supply, the centralized computer means further comprises a firewall over the encrypted tunnel connection, the firewall inhibits any outbound connection from the centralized computer means, the centralized computer means comprises a SSTP ("Secured Socket Tunneling Protocol") server of a SSL ("Secure Sockets Layer") tunnel connection, at least one processing server comprising the confidential data, one security management server, said servers of the centralized computer means being located on a dedicated local network, the centralized computer means further comprises a disk backup server on the dedicated local network, said servers of the centralized computer means are physically one or several computer devices; indeed, the functions of the distinct servers may be separated or grouped in one or several computer devices such as a physical computer, a physical microcomputer, a physical server, the security management server acts as a certificate manager, a domain controller, a controller for security policy of the remote unit(s), for supervision and repudiation thereof, the identification means are chosen among one or several of the following means: smart card reader, biometric reader, fingerprint reader, one identification means is a password.

The invention also relates to a remote unit to be implemented in a computer system for accessing confidential data by means of at least one remote unit used by a user, the data being stored in a secured centralized computer means comprising means for processing said data, intended for producing results, a computer connection being established between said remote unit and the centralized computer means, the remote unit being a microcomputer operating under the dependency of a local operating system starting by a boot phase, said unit having one or several of the characteristics described and, in particular, being such that it is specially adapted to the system of the invention and it allows that the computer connection is an encrypted tunnel connection over a public network and that said unit is not operable if the computer connection is not established, the encrypted tunnel connection allowing the logical integration of the remote unit into the centralized computer means, in order that said remote unit can only be remotely administered, the microcomputer of the remote station being in the form of an electronic card that further comprises an encryption electronic circuit, the operating system as well as the information required for the operation of said remote unit being stored in encrypted form in said remote unit, and said remote unit is consisted of a sealed unit containing the electronic card and inputs/outputs, including one identification means input/output connected to at least one user identification means, and one computer network input/output intended for the encrypted tunnel connection.

The invention will be better understood thanks to the following description, which relates to a preferred embodiment, given by way of non-limitative example, and explained by reference to the appended drawing, in which FIG. 1 schematically shows the general architecture of the system.

In the embodiment described hereinafter, it is referred to the case of a research environment in which the user is a researcher who has to remotely access the confidential data stored in a secured center comprising a server of said data. Within such context, the remote unit constitutes a terminal on which the researcher works.

This remote unit, which is in the form of a small-size unit comprising a microcomputer electronic card, is physically and functionally secured against non-compliant and non-authorized uses. Such security means are notably physical and/or logical locking of the external ports not intended for the operation of the system. For example, a possible series RS232 or parallel port of the electronic card is not connected to its connector or the connector is omitted or is hidden/made unusable. It will be noted that, as any input/output of the microcomputer, the locking may also be a logical/software locking: the port(s) in question have no pilot(s) in the operating system of the remote unit or the pilot is deactivated. The unit is also physically protected against intrusions by its structure (mechanical strength, absence of opening in some parts of the unit . . . ), its mode of assembly (use of security screws), intrusion detection by an electric contactor, by a photoelectric cell . . . .

Moreover, for the establishment of the encrypted tunnel connection between the users remote unit and the secured center with its data server, the boot sequence is pre-established by previously programming the remote station. Furthermore, the local operating system is locked and the information memorized in the remote station's unit, programs or local data, is stored in an encrypted form.

The remote station is thus a restrained stand-alone unit integrating its own operating system (Windows Vista© in this example). This unit is protected from the host local network by an integrated firewall and the USB© ports thereof are restricted to the software-authorized peripherals through the centralized administration device, which is installed at the unit's boot-up.

To use his remote unit, the researcher must open a session therein, which can be done only through authentication using an identification means, which is herein a smart card containing a valid certificate, a pin-code access, and which is read by a reader connected to the station by a USB connection. In a preferred embodiment, a biometric sensor is also implemented for the researchers authentication, preferably of the fingerprint reader type.

Generally, as for the users, an adequate training of the users relating to the system is preferable and the first connection of the remote station is preferably made under the control of the system manager, which allows an initialization of the smart card pin code and a fingerprinting in case such a sensor is implemented.

Once the session is open on the remote station, a program of access to the confidential data server of the secured centralized computer means runs so as to create the encrypted tunnel computer connection over a public network, for example INTERNET©, and this is the only one program that can run after a session opening. Consequently, the user sees and can use only one program, predefined in advance. A utility software of the remote unit monitors the activity of the researcher (notably keystrokes) and, when it detects an absence of activity during a determined time (an automatically incrementing inactivity-time counter is reset at each action of the researcher), it closes the session that was open and/or gives the possibility during a determined time to the researcher to performs an action that reset the inactivity-time counter. In such a manner, if the researcher forgets to close his session at the end of his work, the session will be automatically closed, which will limit the risks of use of the remote station by a third-party person once the researcher is gone. In a preferred embodiment, a particular utility program will ask the remote unit's user a biometric authentication at regular time intervals, in order to always be sure of the users real identity.

For the creation of the encrypted tunnel connection, all the elements of information for the network connection are available and encrypted in the mass memory of the remote station. Indeed, the microcomputer electronic card, referred to as motherboard, of the remote unit comprises an encryption chip and the encryption key(s) used are stored in the remote unit, also in encrypted form. By construction, no confidential data of the secured centralized computer means is transferred and stored in the remote station; only screen copies or display instructions are sent to the remote station by the central secured server containing the confidential data. All the exchanges between the remote station and the central secured server are made through the public network, INTERNET© in the present example, and an end-to-end encrypted communication system, an encrypted tunnel, has been installed. Moreover, only the remote units that are physically located in establishments identified by their network address can reach, within the secured centralized computer network, the central secured server containing the confidential data.

Still for security reasons, the system has been designed so as to make it possible to remotely perform all the management, monitoring, software and security update operations of each remote station. It also makes it possible to centrally authorize or repudiate (on the secured centralized computer means side) a remote station or a given certificate.

The remote unit may be integrated into any computer environment and local network of the user/researcher's location. For that reason, it is preferable that the configuration of this computer environment and this local network is known so as to efficiently manage the security of accesses by the secured centralized computer means that comprises the confidential data server.

The connection between the remote station and the secured centralized computer means is performed in to steps. Firstly, on the remote unit side, the insertion of the smart card into the card reader, coupled with the biometric identification (fingerprint) and a password, make it possible to open a local session on the remote station. Once open, the local session allows the researcher, in a second time, to connect to the secured centralized computer means and to open therein a central session (for example, using the same password). The identification allowed by the smart card is required for opening the two sessions. It is to be noted that removing the card from the reader closes only the local session, leaving the central session active; the latter is found in the state in which it has been left by re-opening the local session on the remote station, i.e. by re-inserting the smart card into the reader and the biometric identification and by giving again the password. To disconnect from the central session, it is just required to close it. It is to be noted that, like for the remote station, an inactivity detection may optionally be implemented, at the secured centralized computer means, to close after a determined time any session started by a remote station and on which no activity has occurred in the centralized computer means.

The above description related to the remote station used by the users to access the confidential data. The following description will now relate to the secured centralized computer means that stores the confidential data and that comprises means for processing said data.

The secured centralized computer means comprises a secured server to which the researchers remotely connect to work. Typically, this server has four processors, 28 Go of random access memory, a 1.7 To ultrafast hard disk. It is moreover highly upgradable (possibility to add memory and processors if required and possibility of clustering). It has a Windows© interface, with the software programs commonly used for statistical data processing.

In order to further increase the security, a used is defined by the couple [identifier, project], which has for consequence that a same researcher working on two projects will not have access to the data of the two projects within the same session. Likewise, the working spaces containing the data files of each project are isolated from each other. On the one hand, the access authorizations for each project are perfectly defined.

And, on the other hand, it is imperative to avoid information and/or resource (data, programs . . . ) sharing, in order to ensure, for example, that no temporary table of a project can be accessed by the members of another project.

Still in the secured centralized computer means, a backup server makes it possible to perform a disk backup of all the system configurations and all the researcher works. It is to be noted that the backup solution based on magnetic tapes has not been chosen to as to avoid any dissemination of these tapes and of the data contain therein.

It is also to be noted that, to further increase the security, any entry and/or exit related to confidential data in the secured centralized computer means can be done only manually by physical displacement of an operator to the site and even, preferably, in the secured local that contains the secured centralized computer means. Generally, any entry of information (data of any format, source programs . . . ) into the secured centralized computer means is made under the control of an administrator of the system.

Typically, the users/researchers have access to:

the confidential data to which they must have access within the framework of their project and which are stored in a specific directory ("SA-Sources");

a space intended for accommodating the intermediate files created within the framework of their projects: programs, database, texts, etc. This space is accessible within a specific directory ("EA-Projects"), and more particularly, within a directory whose name is the "short name" of the project of research and that is written on their smart card. Within each directory, each researcher taking part to the project has a sub-directory whose name is his own researcher "short name".

The projects are thus isolated from each other. The researchers attached to other projects cannot access any of the corresponding sub-spaces and the researchers working together on a project cannot access the personal sub-spaces each other, but have all access to the root directory of their project, in which they can place files and create shared directories. The data administrators also have no access to the researchers' work spaces. The researchers may work within the secured centralized computer means from their remote stations, using these spaces, these files and the available software programs. However, the researchers cannot autonomously export anything, neither on a printer nor in an external file, and they can neither do "copy/cut/paste" operations.

Therefore, the researchers can export only the results compliant with the statistical secret, i.e. results that do not make it possible to access the individual confidential data, and they can thus not export identification information, neither direct nor indirect, for example of one person or one company, and which are stored in the central server.

In a particular embodiment, the exportation device is configured as followed:

the researchers build in their personal space the "object" they want to export in a file, making sure that this object is perfectly compliant with the statistical secret, and they complement this object with a short documentation describing it in another file;

the researchers deposit these two files in an "Exit" directory that is not accessible for reading by the researchers, as in a ballot box: it is possible to make a deposit, but it is not possible to make a read or a modification once the deposit performed;

the researchers send a message to a data administration service of the system, signaling the exit request. A data administrator of the system then examines the "objects" contained in said exit directory. If the data are actually compliant with the statistic secret, he transfers them to a "Departure" directory that is not accessible by the researchers and a copy of the "object" is simultaneously archived.

computer specialists physically transfer the "objects" from the "Departure" directory to an account that is located outside the secured centralized computer means and, once this operation is performed, these "objects" are sent by electronic messaging to their recipients.

As for the information that may be imported by the users into the secured centralized computer means, only "inactive/non-executable" objects (no executable object) or programs of a documented given type can be imported. The importation is made under the control of an administrator to whom the researchers send by electronic messaging the "object" in question and a description of each file. After checking, the researcher is informed of the importation and he finds his files in the specific directory of the secured centralized computer means to which he has access.

FIG. 1 shows the general architecture of the system. On the left of FIG. 1 is shown what concerns the user with his remote unit 1 comprising the remote unit 4 to which is connected by USB© connection a keyboard (not shown), smartcard and biometrical readers 6, as well as a visualization screen 5. A pointing means (not shown) may also by connected by USB© connection to the unit. The unit 4 contains only one locked operation system VISTA© and the whole connection information is encrypted. This unit 4 is connected to a local network 7 of the ETHERNET© type, connected to a terminal equipment 8 for connection to an INTERNET© network 2. Therefore, in this example, the encrypted tunnel connection over INTERNET© is made indirectly from the unit, with the computer network input/output of the remote station connected to a local network having an access to the INTERNET© network. The establishment in which the remote unit 1 is located has an IP address. Over the INTERNET© network 2, between the secured centralized computer means and the remote station, no data is carried in clear text and all the data are doubly encrypted (SSTP, RDP) in the encrypted tunnel.

On the right of FIG. 1 is shown what concerns the secured centralized computer means 3, in which are stored the confidential data. A firewall 9 is arranged at the interface with the secured centralized computer means over the INTERNET© network 2 on which a SSL VPN encrypted tunnel connection is established between the remote station and the secured centralized computer means 3. The latter comprises one application server 11 SECHPC01 for storage and secured processing of the confidential data, one security management server 12, one backup server DPM 2007 and one SSTP communication server for the SSL tunnel. This set of servers is located on a dedicated local network within the establishment in which the secured centralized computer means 3 is located. Over this dedicated local network, confidential data can preferably only be introduced/extracted (input/output) manually by an operator. The firewall 9 authorizes only entry of encrypted flows coming from registered and authorized establishments having remote units. No outbound connection is authorized, and only screen copies or display instructions are sent back from the secured centralized computer means to the remote units. No confidential data can exit from the secured centralized computer mean 3.

It is to be understood that the invention can be adapted according to many other possibilities without thereby departing from the framework defined by the description and the claims. Finally, the protected names cited in the present document belong to their respective owners.

The invention claimed is:

1. A computer system for accessing confidential data by at least one remote unit used by a user, the confidential data being stored in a secured central computer comprising;
   a hardware data processor producing results based on the confidential data, and
   an encrypted tunnel computer connection over a public network established between said remote unit and the central computer,
   the remote unit being a microcomputer operating under the dependency of a local operating system starting by a boot phase, and when the confidential data are accessed, said remote unit receives only display information related to a process carried out on the confidential data and produced by the central computer,
   wherein the remote unit comprises an operating program that does not allow said process in the absence of the encrypted tunnel computer connection between said remote unit and the central computer, and
   wherein the computer system allows administration of the remote unit only remotely from the central computer, the remote unit being logically integrated to the central computer once the encrypted tunnel computer connection is established, in order to allow said only remote administration of said remote unit and said process of said remote unit after establishment of the encrypted tunnel computer connection,
   the microcomputer of the remote unit being in a form of an electronic card that further comprises an encryption electronic circuit, the operating system as well as information required for the process of said remote unit being stored in encrypted form in said remote unit,
   wherein said remote unit is a sealed unit containing the electronic card and inputs/outputs, including one identification device input/output connected to at least one user identification device, and one computer network input/output intended for the encrypted tunnel connection,
   wherein the remote unit further comprises a local configuration assembly accessible and visible by the user, said local configuration assembly comprising a display and a set of keys arranged in the remote unit and allowing an on-site configuration of local parameters, and
   wherein the encrypted tunnel connection over the public network is made directly from the remote unit, with either an equipment for interconnection to the public network arranged between the computer network input/output of the remote unit and the public network, or the equipment for interconnection to the public network is incorporated to the remote unit.

2. The system according to claim 1, wherein the display comprises a liquid crystal alphanumerical display, the set of keys being a reduced set of less than 7 keys.

3. The system according to claim 1, wherein the central computer further comprises a firewall over the encrypted tunnel connection.

4. The system according to claim 1, wherein the central computer comprises an SSTP server of a SSL tunnel connection, at least one application server comprising the confidential data, and one security management server, said servers of the central computer being located on a dedicated local network.

5. The system according to claim 4, wherein the central computer further comprises a backup server on the dedicated local network.

6. The system according to claim 1, wherein the at least one user identification device is chosen from among a group consisting of: smart card reader, biometric reader, and fingerprint reader.

7. A remote unit for accessing confidential data stored in a secured central computer comprising;
   a hardware data processor producing results based on the confidential data, and an encrypted tunnel computer connection over a public network established between said remote unit and the central computer,
   the remote unit being a microcomputer operating under the dependency of a local operating system starting by a boot phase, and wherein the remote unit comprises:
   an operating program that does not allow accessing the confidential data in the absence of the encrypted tunnel computer connection between said remote unit and the central computer, the encrypted tunnel computer connection allowing logical integration of the remote unit into the central computer, and
   wherein the remote unit is configured to allow administration of the remote unit only remotely from the central computer,
   the microcomputer of the remote unit being in a form of an electronic card that further comprises an encryption electronic circuit, an operating system as well as information required for the accessing the confidential data of said remote unit being stored in encrypted form in said remote unit,
   wherein said remote unit is a sealed unit containing the electronic card and inputs/outputs, including one identification device input/output connected to at least one user identification device, and one computer network input/output intended for the encrypted tunnel connection, and
   wherein the remote unit further comprises a local configuration assembly accessible and visible by a user, said local configuration assembly comprising a display and a set of keys arranged in the remote unit and allowing an on-site configuration of local parameters, and
   wherein the encrypted tunnel connection over the public network is made directly from the remote unit, with either an equipment for interconnection to the public network arranged between the computer network input/output of the remote unit and the public network, or the equipment for interconnection to the public network is incorporated to the remote unit.

8. The remote unit according to claim 7, wherein the display comprises a liquid crystal alphanumerical display, the set of keys being a reduced set of less than 7 keys.

* * * * *